US008380233B2

United States Patent
Pradas et al.

(10) Patent No.: US 8,380,233 B2
(45) Date of Patent: Feb. 19, 2013

(54) METHOD AND ARRANGEMENT FOR THE ALLOCATION OF E-DCH COMMON RESOURCES IN A TELECOMMUNICATION SYSTEM

(75) Inventors: Jose Luis Pradas, Jorvas (FI); Johan Bergman, Stockholm (SE); Stefan Wager, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 225 days.

(21) Appl. No.: 12/863,849

(22) PCT Filed: Nov. 26, 2008

(86) PCT No.: PCT/SE2008/051353
§ 371 (c)(1),
(2), (4) Date: Jul. 21, 2010

(87) PCT Pub. No.: WO2009/102253
PCT Pub. Date: Aug. 20, 2009

(65) Prior Publication Data
US 2010/0298019 A1  Nov. 25, 2010

Related U.S. Application Data

(60) Provisional application No. 61/027,562, filed on Feb. 11, 2008.

(51) Int. Cl.
*H04B 7/00* (2006.01)

(52) U.S. Cl. ........ 455/509; 455/450; 455/458; 455/464; 370/329

(58) Field of Classification Search .................. 455/509, 455/450, 435.3, 451, 452.1, 452.2, 420, 464, 455/458, 552.1, 561, 115.1; 370/335, 328, 370/329, 400, 341, 311; 714/748, E11.023
See application file for complete search history.

(56) References Cited

U.S. PATENT DOCUMENTS

| | | | |
|---|---|---|---|
| 8,149,773 B2* | 4/2012 | Sambhwani et al. | 370/329 |
| 2004/0146019 A1* | 7/2004 | Kim et al. | 370/329 |
| 2009/0088175 A1* | 4/2009 | Pelletier et al. | 455/450 |
| 2009/0135769 A1* | 5/2009 | Sambhwani et al. | 370/329 |
| 2009/0196230 A1* | 8/2009 | Kim et al. | 370/328 |
| 2009/0196242 A1* | 8/2009 | Sambhwani et al. | 370/329 |
| 2009/0196261 A1* | 8/2009 | Sambhwani et al. | 370/335 |
| 2010/0215005 A1* | 8/2010 | Pradas et al. | 370/329 |
| 2012/0155420 A1* | 6/2012 | Sambhwani et al. | 370/329 |

FOREIGN PATENT DOCUMENTS

CN    1723638         1/2006
WO   WO 2006/135289 A1   12/2006

OTHER PUBLICATIONS

International Search Report for PCT/SE2008/051353, mailed Mar. 31, 2009.
Written Opinion of the International Searching Authority for PCT/SE2008/051353, mailed Mar. 31, 2009.
Nokia Siemens Networks et al., "RP-070677 Enhanced Uplink for CELL-FACH State in FDD", Internet Citation, (Sep. 11, 2007), 3 pages.

(Continued)

*Primary Examiner* — Tan Trinh
(74) *Attorney, Agent, or Firm* — Nixon & Vanderhye, P.C.

(57) ABSTRACT

In a method and a radio base station, the radio base station when receiving a preamble to access one of the E-DCH common resources is adapted to send a NACK even if the default resource for that particular preamble is free. As a result, the UE will monitor the E-AICH and another 'non-default' configuration will be assigned. As a consequence, the default configurations will be the last resources to be assigned.

12 Claims, 2 Drawing Sheets

OTHER PUBLICATIONS

Ericsson: "Enhanced Uplink for CELL FACH", 3GPP TSG RAN WG1 Meeting #50bis; R1-073954, (Oct. 12, 2007), 3 pages.

Ericsson: "Number of E-DCH configurations in Enhanced CELL_FACH", 3GPP TSG RAN WG1 Meeting #51bis, R1-080409, (Jan. 14-18, 2008), 4 pages.

Universal Mobile Telecommunications System (UMTS); Physical channels and mapping of transport channels onto physical channels (FDD), 3GPP TS 25.211, vol. 3-R1, No. V8.2.0, (Oct. 1, 2008), 58 pages.

Universal Mobile Telecommunications System (UMTS); Physical layer procedures (FDD), 3GPP TS 25.214, vol. 3-R1, No. V8.3.0, (Oct. 1, 2008), 91 pages.

International Preliminary Report on Patentability mailed Aug. 26, 2010 in corresponding PCT Application No. PCT/SE2008/051353.

Chinese Office Action issued in Application No. 200880125557.0 dated Oct. 10, 2012 with English Translation.

* cited by examiner

METHOD AND ARRANGEMENT FOR THE ALLOCATION OF E-DCH COMMON RESOURCES IN A TELECOMMUNICATION SYSTEM

This application is the U.S. national phase of International Application No. PCT/SE2008/051353 filed 26 Nov. 2008, which designated the U.S. and claims the priority to U.S. Provisional No. 61/027,562 filed 11 Feb. 2008, the entire contents of each of which are hereby incorporated by reference.

FIELD OF THE INVENTION

The technology disclosed herein relates to a method and arrangement in a telecommunication system. In particular the technology disclosed herein relates to a method and a device for allocating Common E-DCH resources.

BACKGROUND

Previous to Third Generation Partnership Project (3GPP) Release 7, a User Equipment (UE) which was in a CELL_FACH state had to switch to CELL_DCH state whenever the radio base station Node-B needed to address the UE through the High Speed (HS) or Dedicated Channel (DCH) channels. This implied that several control messages had to be exchanged between the UE and Node-B, and between the Node B and the Radio Network Controller (RNC); therefore there was a considerable delay since the procedure waited until the state was changed to CELL_DCH. 3GPP Release 7 introduced a feature in which Node-B could address to a UE using the High Speed Shared Control Channel/High-Speed Downlink Shared Channel (HS-SCCH/HS-DSCH) while the UEs state was CELL_FACH. As a result, delays were reduced and performance improved.

However, a UE may sometimes address the Node-B when the UE has data to transmit. If the UE is in CELL_FACH and needs to use the DCH or the Enhanced dedicated channel (E-DCH) channels, the UE needs to access the network through the Random Access Channel (RACH) procedure, synchronize in both the Uplink (UL) and the down link (DL), and move to CELL_DCH when the UE is able to start transmitting data. This process also requires some exchange of control messages between the Node-B and Radio Network Controller (RNC).

Currently 3GPP is standardizing a new procedure in which a UE can use E-DCH channels while the UE is in CELL_FACH and without changing the state to CELL_DCH. The work item is called 'Enhanced Uplink in CELL_FACH'. One objective is to improve the Uplink (UL) in a similar way as the Downlink (DL) was improved in 3GPP Release 7.

In accordance with current standardization, when a UE which is in CELL_FACH state and has data in its transmission buffer; it starts the random access procedure to access the network. For access, the UE is adapted to choose one signature and to start a power ramping process. This procedure was already specified in 3GPP Rel '99. The chosen signature, though, depends on whether the UE request involves a request for E-DCH channels or not. A cell supporting this feature broadcasts the relevant information related to the signatures allocated to request E-DCH resources, E-DCH parameters and any other relevant information thereby making the UEs of the cell are aware about such relevant information. Upon detecting the signature, the network sends an Acknowledgement (ACK) or Negative Acknowledgment (NACK) in the acquisition indicator channel (AICH). An ACK means that the UE can start transmitting its data in a default E-DCH configuration linked to the sent signature. A NACK means that the default configuration is busy. In the later case, i.e. when a NACK is received the UE needs to monitor the Enhanced AICH (E-AICH) which indicates an offset that the UE is supposed to add to its default E-DCH configuration index to obtain the E-DCH configuration index that it has been allocated by Node-B.

AICH/Enhanced AICH (E-AICH) combination may lead to problems in case two UE access a system at the same time with different preambles signatures and the default resources for those signatures are busy.

In this case the Node-B can as a first option send only one NACK on the AICH to one of the UEs, and this one UE will monitor the E-AICH. The other UE will not get any NACK on the AICH and, hence, it will continue the power ramping. As a consequence, it will of course increase the interference level.

A second option that could be applied is that the Node-B sends an NACK to both UEs and both will monitor the E-AICH. Both will choose a resource depending on the offset indicated in the E-AICH. The Node-B needs to decide the offset which can be applied for both UEs. This can lead to two situations:

If the Node-B is able to assign both UEs with a free E-DCH resource using the same offset, both UEs get access to a free resource.

If the Node-B is not able to assign the UEs with a free E-DCH resource using the same offset, it has to send NACK to both UEs, thus increasing the blocking probability.

Hence there exists a need for improving access to an E-DCH common resource of a cellular radio system.

SUMMARY

The technology disclosed herein to provide a method and a radio base station that increases or maximizes the number of UEs which can be acknowledged and at the same time resolve or alleviate the problems associated with the prior art.

In a method and a radio base station (Node B) according to the technology disclosed herein, the radio base station when receiving a preamble to access one of the E-DCH common resources is adapted to send a NACK even if the default resource for that particular preamble is free. As a result, the UE will monitor the E-AICH and another 'non-default' configuration will be assigned. As a consequence, the default configurations will be the last resources to be assigned.

The technology disclosed herein is founded on the insight that default resources will in average be free longer than if they are assigned as a first choice, which is an advantage. Another advantage of the technology disclosed herein is that, in case two UE access the network at the same time with different preambles signatures, the probability that those default configurations are busy will be lower. Hence, there will a significantly higher probability that the NodeB can send ACKs to both of UEs.

Yet another advantage of the technology disclosed herein that in case one of the default configurations linked to the signature is taken, the NodeB can still send one NACK for the busy configuration and one ACK. In this way both UEs will get a resource and both will stop the power ramping procedure thereby reducing the overall interference level in the system.

Yet another advantage of the technology disclosed herein is that in case all default configurations are taken, the UEs will get a NACK in both the AICH and E-AICH. This is due to the fact that default configurations are assigned the last; and therefore, a clear indication will be made that there are no other resource available.

Other objects, advantages and novel features of the technology disclosed herein will become apparent from the following detailed description of the technology disclosed herein when considered in conjunction with the accompanying drawings and claims.

BRIEF DESCRIPTION OF THE DRAWINGS

The technology disclosed herein will now be described in more detail by way of non-limiting examples and with reference to the accompanying drawings, in which.

DETAILED DESCRIPTION

The technology disclosed herein may, of course, be carried out in other ways than those specifically set forth herein without departing from essential characteristics of the technology disclosed herein. The present embodiments are to be considered in all respects as illustrative and not restrictive, and all changes coming within the meaning and equivalency range of the appended claims are intended to be embraced therein.

Figure 1:
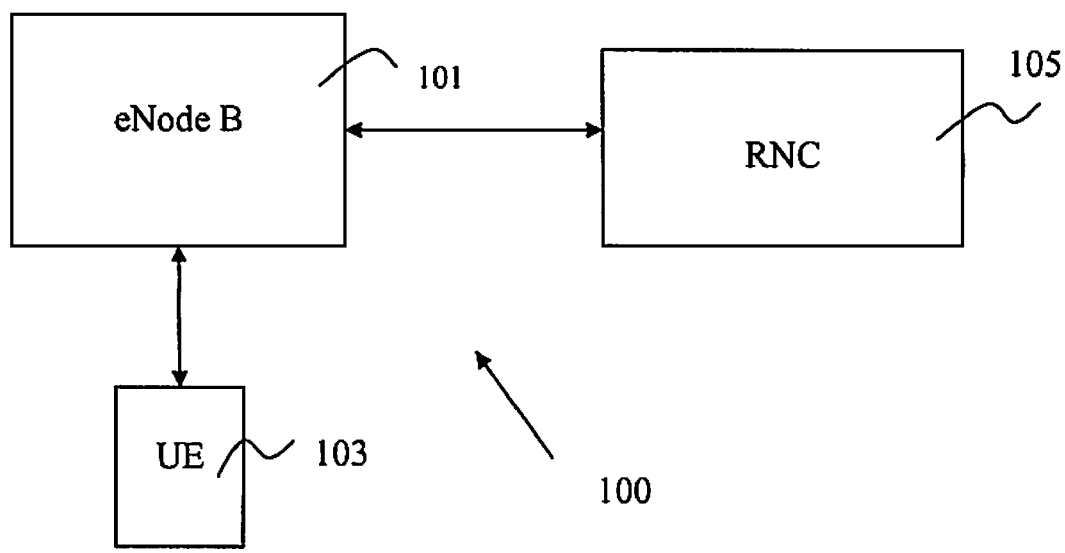
FIG. 1 is a general view of a cellular radio system.

In FIG. 1, a general view of a cellular radio system 100 is depicted. The system can for example be a Wideband Code Division Multiple Access (WCDMA) system or a similar system employing an AICH Acquisition Indicator Channel and E-AICH Enhanced AICH. The system 100 comprises a base station (Node B) 101. The base station 101 serves a number of mobile terminals, usually termed User Equipment (UE) 103, located within the area covered by the base station 101. The base station 101 and a number of adjacent base stations (not shown) are further connected to a radio network controller node (RNC) 105.

Figure 2:
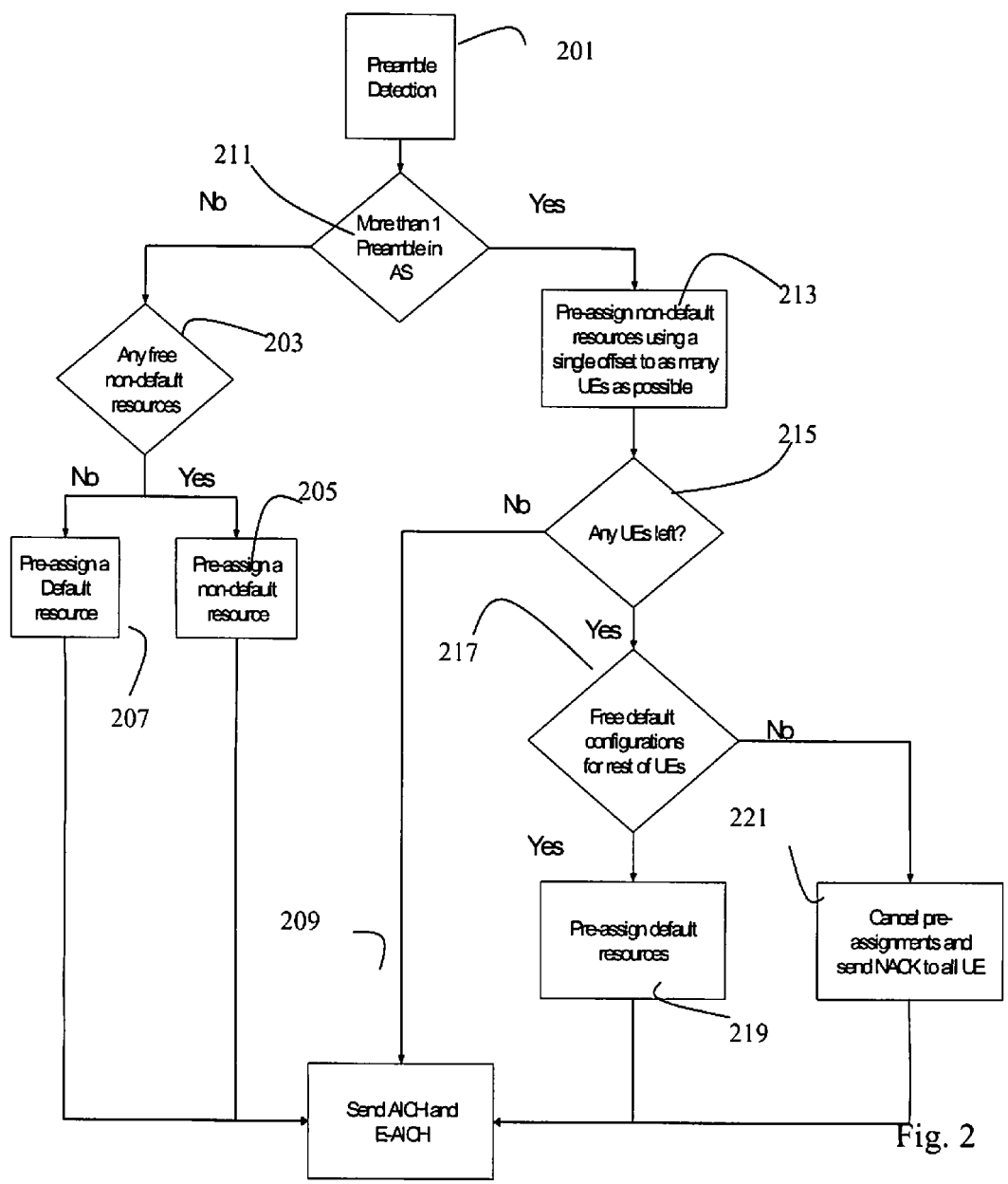
FIG. 2 is a flowchart illustrating a non-limiting exemplary procedure for resource assignment in a radio base station NodeB.

The Node-B 101 is adapted to control the common E-DCH resources. In FIG. 2 a flow chart illustrating procedural steps performed when controlling the E-DCH resources in accordance with one embodiment is depicted. As described above, when a UE request access to the network because it has data in its buffer, the UE starts by transmitting a PRACH preamble signature. This signature depends whether the UE requests for an E-DCH resource or not. When the Node-B receives a correct signature which requests an E-DCH resource in a step 201, Node-B needs to check if it has any other available E-DCH resource than the default E-DCH resource linked to the signature in a step 203. Should the Node-B have any other available resource, Node-B sends a NACK in the AICH forcing the UE to monitor the E-AICH in which the Node-B will indicate the resource allocated to the UE in a step 205. However, should the Node-B not have any other available resource, Node-B sends an ACK in a step 207. Based on the assignments in steps 205 and 207 AICH and E-AICH are sent in a step 209.

This way default E-DCH configurations may be occupied less than the other resources leading to improvements in the overall performance of the system.

If two UEs access the network with different signatures and in the same access slot in a step 211, there is very high probability that at least one of the default configurations is free. Therefore, the Node-B may send one (or two) ACKs indicating the UEs to use the default configurations linked to the sent signatures, or Node-B may send an ACK to one UE and a NACK to the other UE and allocating another resource through the E-AICH to that particular UE, avoiding this way to use the default configurations.

A similar reasoning applies when more than two UEs try to access the network. For example when two or more UEs try to access the system in the same slot as detected in step 211, the radio base station Node B can pre-assign non-default resources using a single offset to as many UEs as possible in a step 213. If all UEs are determined to have been assigned non-default resources in a step, the procedure continues to step 209. If there is at least one UE left that has not been assigned a non-default resource as determined in step 215 the procedure continues to a step 217. In step 217 it is determined if there are free default configurations for the remaining UEs. The procedure proceeds to a step 219. Else the procedure proceeds to a step 221. In step 219 the default resources are pre-assigned to the remaining UEs and the procedure proceeds to step 209. If there are not resources for all UEs and the procedure ends up in step 221 pre-assignments are cancelled and a NACK message is sent to all UEs.

The method as described has a drawback. This drawback is that for each preamble signature, AICH and E-AICH is sent which is quite aggressive (since the interference level may increase) for networks in which the load is relatively low. However, in order to minimize the impact of this, the use of the algorithm can be restricted to high-load scenarios, where the UEs are competing for the E-DCH configurations, i.e. in low-load scenarios Node-B may choose to allocate the default E-DCH configuration to an accessing UE, while in high-load scenarios Node-B instead uses a method in accordance with the above to avoid unnecessarily high blocking probability.

As an example, a new parameter p may be introduced to control how aggressive the algorithm performs. This parameter 'p' belong to [0 . . . 1] and it may be set dynamically by the Node-B depending on the interference level or load or any other relevant indicator, or it may be set manually, or by the RNC. A Node-B may generate a value before deciding how and what resource to allocate to the UE. For example, if the generated value is below 'p', Node-B may try to assign the UE in the default E-DCH configuration while if the value is above 'p', Node-B may to assign another resource as described hereinabove. This provides another degree of freedom and network adaptability.

The method and radio base station as described herein achieves a better management of the limited E-DCH resources available and controlled by the Node-B. Thanks to this better management of resources, the blocking probability for the E-DCH resources may be alleviated in high load scenarios.

The invention claimed is:

1. A method of controlling Enhanced Dedicated Channel (E-DCH) common resources in a radio base station the method comprising:
   receiving a preamble to access one of the E-DCH common resources from a User Equipment;
   returning to the User Equipment a Negative Acknowledgement if a default resource for the received preamble is free and at least one other resource is free.

2. The method according to claim 1, wherein the Negative Acknowledgement is transmitted in An Acquisition Indicator Channel (AICH).

3. The method according to claim 1, wherein preambles from at least two User Equipments are received in a slot, and wherein the method further comprising assigning non-default E-DCH common resources to as many User Equipments as possible.

4. The method according to claim 3, further comprising assigning default resources to the User Equipments that are not assigned non-default resources.

5. The method according to claim 3, further comprising sending a Negative Acknowledgement to all User Equipments if there are less E-DCH resources than received preambles for accessing E-DCH common resources.

6. The method according to claim 1, further comprising returning to the User Equipment the Negative Acknowledgement only if a system parameter is above or below a predetermined value.

7. A radio base station adapted to control Enhanced Dedicated Channel (E-DCH) common resources in a cellular radio system, the radio base station comprising:
   means for receiving a preamble to access one of the E-DCH common resources from a User Equipment, and;
   means for returning to the User Equipment a Negative Acknowledgement if a default resource for the received preamble is free and at least one other resource is free.

8. The radio base station according to claim 7, further comprising means for transmitting the Negative Acknowledgement in An Acquisition Indicator Channel AICH.

9. The radio base station according to claim 7, further comprising means for assigning non-default E-DCH common resources to as many User Equipments as possible in response to receiving at least two preambles from User Equipments in a slot.

10. The radio base station according to claim 9, further comprising means for assigning default resources to User Equipments that are not assigned non-default resources.

11. The radio base station according to claim 9, further comprising means for sending a Negative Acknowledgement to all User Equipments if there are less E-DCH common resources than received preambles for accessing E-DCH common resources.

12. The radio base station according to claim 7, further comprising means for setting a system parameter, the radio base station further being configured to returning to the User Equipment a Negative Acknowledgement if the system parameter is above or below a value of the system parameter.

* * * * *